US010487298B2

(12) United States Patent
Friedman

(10) Patent No.: US 10,487,298 B2
(45) Date of Patent: Nov. 26, 2019

(54) PROCESS FOR FORMING A DESCALING COMPOSITION

(71) Applicant: Ilan Friedman, Mexico City (MX)

(72) Inventor: Ilan Friedman, Mexico City (MX)

( * ) Notice: Subject to any disclaimer, the term of this patent is extended or adjusted under 35 U.S.C. 154(b) by 144 days.

(21) Appl. No.: 15/741,904

(22) PCT Filed: Jul. 15, 2015

(86) PCT No.: PCT/US2015/040628
§ 371 (c)(1),
(2) Date: Jan. 4, 2018

(87) PCT Pub. No.: WO2017/011010
PCT Pub. Date: Jan. 19, 2017

(65) Prior Publication Data
US 2018/0195031 A1  Jul. 12, 2018

(51) Int. Cl.
| | |
|---|---|
| *C11D 3/04* | (2006.01) |
| *C11D 3/30* | (2006.01) |
| *C11D 11/00* | (2006.01) |
| *C11D 7/46* | (2006.01) |
| *C11D 7/32* | (2006.01) |
| *C23G 1/02* | (2006.01) |
| *C02F 5/12* | (2006.01) |
| *C11D 7/06* | (2006.01) |
| *C11D 3/02* | (2006.01) |
| *C11D 7/08* | (2006.01) |
| *B21B 45/06* | (2006.01) |
| *B21B 45/04* | (2006.01) |
| *C23F 14/02* | (2006.01) |
| *C23G 1/06* | (2006.01) |
| *C02F 103/02* | (2006.01) |

(52) U.S. Cl.
CPC .......... *C11D 11/0094* (2013.01); *B21B 45/04* (2013.01); *B21B 45/06* (2013.01); *C02F 5/12* (2013.01); *C11D 3/02* (2013.01); *C11D 3/30* (2013.01); *C11D 7/06* (2013.01); *C11D 7/08* (2013.01); *C11D 7/32* (2013.01); *C11D 7/3209* (2013.01); *C11D 7/46* (2013.01); *C11D 11/0041* (2013.01); *C23F 14/02* (2013.01); *C23G 1/02* (2013.01); *C23G 1/066* (2013.01); *C02F 2103/023* (2013.01)

(58) Field of Classification Search
CPC .... C11D 3/02; C11D 3/30; C11D 7/08; C11D 7/32; B21B 45/04; B21B 45/06
USPC ................. 510/247, 254, 264, 269; 29/81.01
See application file for complete search history.

(56) References Cited

U.S. PATENT DOCUMENTS

| | | | | |
|---|---|---|---|---|
| 1,789,805 A | * | 1/1931 | Burke | ........................ C02F 5/08 |
| | | | | 510/263 |
| 3,374,055 A | * | 3/1968 | Villalon | ................ C01B 25/185 |
| | | | | 423/309 |
| 3,686,123 A | * | 8/1972 | Hiroshi | ..................... C23G 1/08 |
| | | | | 510/253 |

FOREIGN PATENT DOCUMENTS

| | | | |
|---|---|---|---|
| CN | 104726876 | * | 6/2015 |
| WO | WO1997/044428 | * | 11/1997 |
| WO | WO2011/115302 | * | 9/2011 |

OTHER PUBLICATIONS

English Language Machine Translation of the Abstract of CN104726876. (Year: 2015).*

* cited by examiner

*Primary Examiner* — Gregory R Delcotto
(74) *Attorney, Agent, or Firm* — Egbert Law Offices, PLLC

(57) ABSTRACT

A process for forming a descaling composition has the steps of macerating a bone meal with a dimethylamine solution, digesting the macerated bone meal with hydrochloric acid, neutralizing the digested bone meal with calcium oxide, treating the neutralized bone meal with sulfuric acid, and applying a refluxing treatment with dimethylamine and hydrazine hydrate. The process further includes removing the macerated bone meal solids from the dimethylamine solution and transferring the removed solids to an extraction tower prior to the step of digesting. The hydrochloric acid is circulated through the macerated bone meal. The treated bone meal and the sulfuric acid is filtered so as to produce a liquid phase and a solids phase. The liquid phase contains a phosphate amine. The dimethylamine and hydrazine hydrate are added to the liquid phase.

23 Claims, No Drawings

PROCESS FOR FORMING A DESCALING COMPOSITION

FIELD OF THE INVENTION

The present invention relates to descaling compositions. More particular, the present invention relates to a process for forming such descaling compositions. Additionally, the present invention relates to descaling compositions that can be used for the removal of scale from process equipment used in the energy industry. The present invention also relates to processes for the descaling of processing towers.

BACKGROUND OF THE INVENTION

Scaling is the accumulation of unwanted material on solid surfaces to the detriment of the function. The scaling material can consist of either living organisms are non-living substances, organic or inorganic. Scaling is a common and diverse phenomenon. Scaling can occur on the ship hulls, scaling of heat transfer components throughout process industries, and deposits found on a variety of other structures.

When scaling occurs on heat exchange surfaces, it tends to reduce the thermal efficiency, decrease the heat flux, increases temperature on the hot side, decreases temperature on the cold side, induces under-deposit corrosion, and increases the use of cooling water. In piping and flow channels, the scaling will reduce flow, increase pressure drop, increase upstream pressure, increase energy expenditure, cause float oscillations and cavitation, and also induce vibrations and cause float blockage. When scaling occurs on ship hulls, it can create additional drag, increased fuel usage and reduce maximum speed. Scaling on turbines will reduce the efficiency and increase the probability of failure. In the case of reverse osmosis membranes, such scaling will increase pressure drop, increase energy expenditure, reduce flux, and will eventually cause membrane failure. Scaling can also incur on injection/spray nozzles. As a result, this can cause an incorrect amount of injected fluid, a malformed jet, component inefficiency and component failure. Whenever scaling occurs in the production zone of petroleum reservoirs and oil wells, this can result in decreased petroleum production, plugging, and an actual stoppage of flow. Whenever these issues occur, in order to properly descale the particular item, a shutdown of the facilities is often required. The shutdown can reduce production time and increase costs.

The result of scaling is ubiquitous and generates tremendous operational losses. For example, one estimate puts the losses due scaling of heat exchangers in industrialized nations to be approximately 0.25% of the gross domestic product. The losses initially result from impaired heat transfer, corrosion damage, increase pressure drop, flow blockages, flow free distribution inside components, flow instabilities, induced vibrations, fretting, and a large number of other unanticipated problems. Additionally, there are significant ecological costs associated with such scaling.

Typically, biosides can be applied so as to reduce scaling. These biosides can include inorganic chlorine and bromide compounds, chlorine and bromide cleavers, ozone oxygen cleavers, and unoxidizable biosides. One of the most important unoxidizable biosides is a mixture of chloromethyl-isothiazolinone and methyl-isothiazolinone. Chemical scaling inhibitors can reduce scaling in many systems by interfering with the crystallization, attachment or consolidation steps of the scaling process. These can include chelating agents, long-chain aliphatic ammines or polyamines, organic phosphonic acids, polyelectrolytes, and polymethacrylic acid. In the case of boilers, aluminum or magnesium additives can serve to avoid such scaling. Unfortunately, each of these components can often be toxic to the environment and can require the persons applying the descaling agents to wear specialized equipment to prevent exposure to such toxic chemicals.

Chemical or mechanical cleaning processes for the removal of deposits and scales are used when the scaling reaches the point of impacting the performance of the system. These processes comprise pickling with acids and complexing agents, cleaning with pipe-velocity water jets, recirculating or blasting with metal, or propelling off-line mechanical bullet-type tube cleaners. The chemical cleaning causes environmental problems through handling, application, storage and disposal of chemicals. The mechanical cleaning can be an environmentally friendlier solution though often requires a great deal of time, equipment and costs. As such, a need has developed so as to provide a descaling solution that can be applied which is non-toxic, extremely effective, and reduces facility downtime.

In the past, various patents have issued relating to descaling compositions. For example, U.S. Pat. No. 2,450,861, issued on Oct. 5, 1948 to H. A. Robinson, describes a composition for descaling ferrous metal. This composition includes 5 to 25% by weight of hydrogen chloride, 0.1 to 1% of an organic nitrogen base, and 2.2 to 3.3% of a water-soluble salt. The salt can be a water-soluble divalent chromium salt, or a titanium salt.

U.S. Pat. No. 2,485,528, issued on Oct. 18, 1949 to Cardwell et al., shows another composition for descaling ferrous metal surfaces. This composition includes an aqueous solution containing from 5 to 25% of hydrogen chloride, and between 0.1 and 1% of an organic nitrogen base soluble in the hydrochloric acid. The organic nitrogen base can be either an aromatic or heterocyclic nitrogen base. The composition also includes from 0.1 to 2% of the water-soluble thiocyanate.

U.S. Pat. No. 3,025,225, issued on Mar. 13, 1962 to Snyder et al., discloses an electrolytic acid for the descaling of metals. This descaling composition is in a bath that include 60% to 95% of sulfuric acid, 0.5% to 20% of hydrofluoric acid, 0.001% of sulfite ions, 0 to 0.5% of orthophosphoric acid, and the remainder being water.

U.S. Pat. No. 3,030,239, issued on Apr. 17, 1962 to Mekjeam et al., teaches a process for the descaling of metals. The metal to be treated receives between 50 to 90% of an alkali metal hydroxide, 2 to 25% of an alkali metal phosphate, 0.5% to 30% of an alkali metal carbonate, and 0.5 to 25% of a material selected from the group of alkali metal halide, alkaline earth metal halides, and mixtures thereof.

U.S. Pat. No. 3,121,026, issued on Feb. 11, 1964 to Beigay, discloses the descaling of metals and alloys with aqueous potassium hydroxide. The process is intended to remove metal oxide scale on a surface thereof. The article is brought into contact with an aqueous bath that contains 60 to 90% potassium chloride oxide and at least 10% water while maintaining the bath at a temperature between 300° F. to 450° F.

U.S. Pat. No. 3,277,008, issued on Oct. 4, 1966 to A. H. Heit, discloses a surface cleaning method and composition. In particular, this composition serves to descale internal metal surfaces of a jacket of glass-lined jacketed equipment while preventing spallation of the glass lining. An aqueous acid solution contains between 2 and 20% of an alpha-beta ethylenically unsaturated, water-soluble carboxylic acid.

The carboxylic gas serves to react with insoluble phosphates, carbonates, and hydroxide to produce water-soluble compounds.

U.S. Pat. No. 4,439,339, issued on Mar. 27, 1984 to C. J. Doumit, provides a descaler composition and method for the removal of scale from freshwater production equipment such as desalinators or evaporators, along with distillation units, heat exchangers and boilers. The composition includes a blend of acids of various strengths so as to provide a timed release effect. The acids include hydrochloric acid, dichloroacetic acid, and acetic acid. The composition further contains a surfactant, such as isopropyl alcohol, which reacts with the acids. The composition further includes an acid-based indicator to signify neutralization of the acidizer during scale removal.

U.S. Pat. No. 5,575,857, issued on Nov. 19, 1996 to Lunski et al., provides an aqueous alkaline metal descaling concentrate. This process includes the steps of applying an aqueous solution containing alkali metal carbonate salts and a hydrotrope so as to remove organic scale. Additionally, the composition further includes a mixture of potassium and sodium carbonate salts.

It is an object of the present invention to provide a method for forming a descaling composition which can be utilized for the descaling of process equipment and processing towers.

It is another object of the present invention to provide a process for forming a descaling composition that serves to remove encrustions, such as metal oxidizations, encrusted salts, silica, and carbonates.

It is another object of the present invention to provide a process that can remove those encrustation that are generated in the processing of oil and gas.

It is a further object of the present invention to provide a process that can effectively clean heat exchangers.

It is another object of the present invention to provide a process for forming a descaling composition in which the descaling composition is a stainless steel passivator.

It is another object of the present invention to provide a process for forming a descaling composition in which the descaling composition will not damage seals, paints, gaskets and thermal insulation.

It is further object of the present invention provide a process for the forming of a descaling composition in which the descaling composition will not degrade the material upon which it is applied.

It is another object of the present invention to provide a process for the formation of a descaling composition in which the descaling composition is biodegradable, is colorless, has minimal odor, is non-corrosive, is non-toxic, and is nonflammable.

It is another object of the present invention provide a process for the forming of a descaling composition in which the descaling composition can extend the life of the equipment to which it is applied.

It is another object of the present invention provide a process for the formation of a descaling composition in which the descaling composition is operator-friendly.

It is a further object of the present invention to provide a process for the forming of a descaling composition in which the descaling composition is reusable.

It is another object of the present invention to provide a process for the formation of a descaling composition which serves to reduce plant downtime.

It is still a further object of the present invention to provide a process for the formation of a descaling composition which serves to increase equipment productivity.

It is still another object of the present invention to provide a process for the formation of a descaling composition in which the descaling composition will serve to reduce maintenance costs.

These and other objects and advantages of the present invention will become apparent from a reading of the attached specification and appended claims.

BRIEF SUMMARY OF THE INVENTION

The present invention is a process for forming a descaling composition that includes the steps of: (1) macerating a bone meal with a dimethylamine solution; (2) digesting the macerated bone meal with hydrochloric acid; (3) neutralizing the digested bone meal with calcium oxide; (4) treating the neutralized bone meal with sulfuric acid; and (5) applying a refluxing treatment with dimethylamine and hydrazine hydrate.

In the process of the present invention, the step of macerating includes adding the bone meal to the dimethylamine solution. The dimethylamine solution has a 10% concentration. The step of macerating is carried out over a period of eight hours.

In the process of the present invention, the macerated bone meal solids are removed from the dimethylamine solution and then transferred to an extraction tower prior to the step of digesting. The step of a digesting include circulating the hydrochloric acid through the macerated bone meal. The circulating is for a period of time of eight hours at room temperature. The step of digesting further includes decreasing the temperature of the digested bone meal for another period of time. The temperature is decreased to approximately 16° C. for a period of time of approximately two hours. The step of digesting further includes allowing the mixture of the hydrochloric acid and the macerated bone meal to rise to ambient temperature following the step of decreasing the temperature. Solids are removed from the digested bone meal and the hydrochloric acid.

The step of neutralizing includes washing the calcium oxide and the digested bone meal with water such that the calcium oxide in the digested bone meal has a pH of approximately 7. The neutralized bone meal is then dried. In particular, the neutralized bone meal is dried so as to have a humidity of less than 20% water.

The step of treating includes a step of adding the dried bone meal to the sulfuric acid in a reactor and then agitating the sulfuric acid and the dried bone meal in the reactor. Following agitation, the sulfuric acid and the dried bone meal are allowed to stand for a period of time. This period of time is approximately three hours. The sulfuric acid will have a concentration of 98%.

The treated bone meal and the sulfuric acid are filtered so as to produce a liquid phase and a solid phase prior to the step of applying a refluxing treatment. The liquid phase contains phosphated amine. The dimethylamine and the hydrazine hydrate or added to the liquid phase. The mixture is refluxed treated for a period of time. This period of time is approximately eight hours. The dimethylamine is of a 3% concentration. Ultimately, following reflux treatment, the mixture is cooled.

This foregoing Section is intended to describe, with particularity, the preferred embodiment of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

The process of the present invention produces a phosphated descaler for process equipment and includes an antioxidant complex to prevent metal oxidization. The process of the present invention utilizes bone meal. The bone meal is macerated with dimethylamine. Following maceration, the mixture is digested with hydrochloric acid. Following digestion, it is neutralized with calcium oxide. The resulting solids are treated with sulfuric acid. A refluxing treatment is then carried out with dimethylamine and hydrazine hydrate.

Specifically in the process of the present invention, the dimethylamine solution is prepared to a 10% concentration. The bone meal is left to macerate in the dimethylamine solution for a period of eight hours at 40° C. The bone meal is removed by decanting and the dimethylamine solution continues to macerate for second, third and fourth batches. The solution is discarded after treating in the fourth batch.

The solids macerated in the dimethylamine are transferred to an extraction tower for meal digestion. Concentrated hydrochloric acid is circulated therethrough and then recirculated for eight hours at room temperature. After eight hours, the temperature is decreased to 16° C. The hydrochloric acid continues to recirculate for an additional two hours. The mixture is left so as to return to ambient temperature. The solids are then removed from the digester and calcium oxide is introduced therewith. The solids in the calcium oxide are washed with water so as to achieve a pH of 7. If necessary, additional calcium oxide can be added. The solids are then heated on a stove and dried to a humidity of less than 20% water.

Sulfuric acid is added in a glazed reactor. The sulfuric acid is 98% sulfuric acid. The solids are slowly added with agitation. Once all of the solids have been added, the agitator is turned off and the mixture is allowed to stand for more than three hours. The slurry is then filtered. The liquid phase will contain the phosphate amine. 3% dimethylamine and hydrazine hydrate are then added. These are mixed in heated under reflux treatment for a period of eight hours. Subsequently, the mixture is cooled and available for packing and packaging.

The composition that results from this process is a descaler for process equipment, such as heat exchangers, distillation towers, turbines, offshore installations, processing towers, docking facilities, gas line flow stations and pipelines, gas separators, radiators, coils, evaporators, condensers, gas sweetening plants, and a variety of other process equipment. The composition can be used for cleaning, metal oxidation removal, and removal of encrusted salts, such as silica, ammines and carbonates. The composition is excellent for stainless steel passivation. The composition can also remove those encrustations that are generated in the processing of oil and gas.

The composition of the present invention is reusable. As such, it can be used several times, depending upon the type of equipment, and the process and application. The descaling composition will significantly reduce maintenance and operating costs. The composition of the present invention is an excellent substitute for sandblasting. Following application, the present invention will result in white metal. The composition does not damage seals, paints, gaskets, or thermal insulation. The composition does not corrode the stainless steel, bronze or aluminum in treated equipment.

In one experimental test of the composition of the present invention, a gas plant tower was cleaned with the composition. 7000 liters of the composition were utilized for the cleaning. The composition was injected at 30 gallons per minute and with 3 horsepower. The initial design of the tower had a sour gas load of 262.5 MMcfd, a differential pressure of 188 mmHg and a sweet gas temperature of 44° C. Before treatment, the sour gas load was 104 MMcfd, the differential pressure was 154 mmHg, and the sweet gas temperature was 55° C. After application of the composition of the present invention, the sour gas load was 262.0 MMcfd, the differential pressure was 188 mmHg, and the sweet gas temperature was 44° C. As can be seen, the composition of the present invention returned the tower to its original design characteristics.

In traditional cleaning processes, the personnel are exposed to the risk of accessing the confined areas with high pressure pumps of up to 15,000 p.s.i. and 440 volts. The cleaning of the tower was performed in twelve days. This required both shut down and start up. In contrast, with the composition of the present invention, the personnel were not exposed to these risks within the confined areas. No high-pressure pumps were required. The cleaning of the tower was carried out in just five days. This resulted in a significant savings of cleaning time, a reduction in productivity lost and significantly reduced cost of equipment. Since the composition of the present invention can be recovered and filtered, it can be further used in association with other equipment, such as heat exchangers, evaporators, and condensers. It is believed that this composition can be reused for up to five additional times.

In another example of the experimental use of the composition of the present invention, the composition was applied to the tower of a gas regenerating plant. The design characteristics of the plant had a sour gas load of 525 MMcfd and a differential pressure of 88 mmHg. Prior to treatment, the sour gas load was 380 MMcfd and the differential pressure was 116 mmHg. Following treatment, the sour gas load this 500 MMcfd and the differential pressure was 57 mmHg. This tower was cleaned with 9000 liters of the composition at a rate of 50 gallons per minute. For traditional cleaning processes, the required downtime was twelve days compared to the five days required for cleaning with the current composition. This resulted in a seven day savings of required time. As a result, there was enhanced productivity as a result of the present invention.

In another example of the application of the composition of the present invention, the composition was applied to a sweetening tower of a gas plant. The sweetening tower had a design that had a sour gas load of 420 MMcfd and a differential pressure of 125 mmHg. Prior to cleaning, the sour gas load was 325 MMcfd at a differential pressure of 182 mmHg. Following treatment with the composition of the present invention, the sour gas load was 451 MMcfd and the differential pressure was 188 mmHg. This was cleaned with 9000 liters of the composition. Once again, this exhibited a significant savings in the required time for cleaning, a significant reduction in production lost and a significant cost savings.

In general, the gaskets of the absorber tower can be dirty. This is the reason why the tower's differential pressure is very high. Since the differential pressure is high, the design load could not be processed. After cleaning, the gasket recovered its design characteristics so as to correct the high differential pressure and tower channeling problems. The gaskets were returned to their entirely clean condition.

Experiments were further conducted with the composition of the present invention in association with heat exchangers. It is initially found that the heat exchangers were significantly encrusted with scale. The heat exchangers were immersed in the composition of the present invention for a period of 24 hours. As a result, the scaling within the pipes of the heat exchangers was removed and the pipes were returned to their virtually perfect operating condition.

In another experiment conducted with the composition of the present invention, a cooler of a gas sweetening plant was treated with the composition. In particular, the composition was applied to the lean amine plate coolers. These plate coolers were suffering from decreased efficiency. In particular, the scaled plates showed an input temperature of MDEA a 100° C. and water at 28° C. The output temperature of the MDEA was 56° C. and the water temperature was 45° C. After application, the MDEA input temperature was 100° C. and the output temperature was 43° C. This was a 13° C. differential as a result of the cleaning. This resulted in an estimated savings of 92% in the cost of plate cooler maintenance in comparison to the costs associated with other cleaning processes.

The present invention provides a composition that is biodegradable, operator friendly, and reusable. The composition of the present invention reduces plant downtime by reducing cleaning downtime. The composition of the present invention increases equipment productivity, when considering per day production, before and after the cleaning. Equipment maintenance costs are further significantly reduced. The equipment's useful life was significantly extended. This reduces the investment cost associated with new equipment and spare parts.

The composition of the present invention is also highly successful in association with external cleaning. Typically, the paint on external surfaces is scaled with lime. When the composition of the present invention is applied, it will fill pores and brighten the paint. The composition is applicable on spheres, horizontal tanks and vertical tanks. Once again, the savings in comparison with manual cleaning is significant. For a particular tank, the manual cleaning would take 45 days. In contrast, when the composition of the present invention is applied, the cleaning can be carried out in two days. The external cleaning can be carried out in association with flanges, elbows, valves, carbon filters, studs, along with liquid absorber tower rings and gaskets.

The foregoing disclosure and description of the invention is illustrative and explanatory thereof. Various changes in the steps of the described method can be made within the scope of the appended claims without departing from the true spirit of the invention. The present invention should only be limited by the following claims and their legal equivalents.

I claim:

1. A process for forming a descaling composition, the process comprising:
   macerating a bone with a dimethylamine solution;
   digesting the macerated bone meal with hydrochloric acid;
   neutralizing the digested bone meal with calcium oxide;
   treating the neutralized bone meal with sulfuric acid; and
   applying a refluxing treatment with dimethylamine and hydrazine hydrate.

2. The process of claim 1, the step of macerating comprising:
   adding the bone meal to the dimethylamine solution.

3. The process of claim 2, the dimethylamine solution being of a 10% concentration, the step of macerating being for a period of eight hours.

4. The process of claim 1, further comprising:
   removing the macerated bone meal solids from the dimethylamine solution; and
   transferring removed macerated bone meal solids to an extraction tower prior to the step of digesting.

5. The process of claim 1, the step of digesting comprising:
   circulating the hydrochloric acid through the macerated bone meal.

6. The process of claim 5, the step of circulating being for a period of time of eight hours at room temperature.

7. The process of claim 6, the step of digesting further comprising:
   decreasing the temperature of the digested macerated bone meal for another period of time.

8. The process of claim 7, the temperature being decreased to approximately 16° C., the period of time being approximately two hours.

9. The process of claim 7, the step of digesting further comprising:
   allowing the mixture of the hydrochloric acid and macerated bone meal to rise to ambient temperature following the step of decreasing the temperature; and
   removing solids from the digested macerated bone meal and the hydrochloric acid.

10. The process of claim 1, the step of neutralizing comprising:
    washing the calcium oxide and the digested bone meal with the water such that the calcium oxide and the digested bone meal has a pH of approximately 7.

11. The process of claim 1, further comprising:
    drying the neutralized bone meal.

12. The process of claim 11, the dried neutralized bone meal having a humidity of less than 20% water.

13. The process of claim 11, the step of treating comprising:
    adding the dried bone meal to the sulfuric acid in a reactor; and
    agitating the sulfuric acid and the dried bone meal in the reactor.

14. The process of claim 13, further comprising:
    allowing the agitated sulfuric acid and dried bone meal to stand for a period of time.

15. The process of claim 14, said period of time being approximately three hours.

16. The process of claim 13, the sulfuric acid having a concentration of 98%.

17. The process of claim 1, further comprising:
    filtering the treated bone meal and the sulfuric acid so as to produce a liquid phase and a solid phase prior to the step of applying a refluxing treatment, the liquid phase containing a phosphated amine.

18. The process of claim 17, the step of applying further comprising:
    adding the dimethylamine and the hydrazine hydrate to the liquid phase; and
    reflux treating the mixture of the dimethylamine and the hydrazine hydrate and the liquid phase with heat for a period of time.

19. The process of claim 18, the period of time being eight hours, the dimethylamine being 3% dimethylamine.

20. The process of claim 1, further comprising:
    cooling the refluxed composition.

21. The process of claim 1, wherein the descaling composition is used for the descaling of processing towers.

22. The process of claim 1, wherein the descaling composition is used for the descaling of heat exchangers.

23. The process of claim 1, wherein the descaling composition is used to remove encrustations generated in the processing of oil and gas.

* * * * *